(12) United States Patent
Toya et al.

(10) Patent No.: US 6,425,792 B1
(45) Date of Patent: Jul. 30, 2002

(54) METHOD FOR PRODUCING AN ELECTROCHROMIC DEVICE

(75) Inventors: Tomohiro Toya; Yukio Kobayashi; Yoshinori Nishikitani, all of Kanagawa-ken (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/280,321

(22) Filed: Mar. 29, 1999

(30) Foreign Application Priority Data

Mar. 30, 1998 (JP) .......................................... 10-103407

(51) Int. Cl.⁷ .................................................. H01J 9/26
(52) U.S. Cl. ........................................ 445/25; 349/190
(58) Field of Search ............................ 445/25; 349/154, 349/190

(56) References Cited

U.S. PATENT DOCUMENTS 3,808,769 A * 5/1974 Gardiner et al. ............ 349/190
4,023,259 A * 5/1977 Kubota et al. .............. 349/190
4,226,509 A * 10/1980 Jacobs ........................ 349/154

FOREIGN PATENT DOCUMENTS

JP  02-114237  4/1990
JP  06-250230  9/1994

* cited by examiner

*Primary Examiner*—Kenneth J. Ramsey
(74) *Attorney, Agent, or Firm*—Akin, Gump, Strauss, Hauer & Feld, L.L.P.

(57) ABSTRACT

Disclosed is a method for producing an electrochromic device in which to provide an opening in the surface of each of the two electrically conductive substrates of the cell, not in the end surface of the opposed substrates, to insert into one of the openings an elastically deformable sealing member; to fill the inside of the cell by vacuum-injecting an electrolyte or the precursor thereof through the other opening which remains open; to push the sealing member up to the opening for injecting the electrolyte or the precursor so as to dose this opening as well; and to bond the sealing member extending through the two openings to each of the substrates with an adhesive.

4 Claims, 1 Drawing Sheet

METHOD FOR PRODUCING AN ELECTROCHROMIC DEVICE

BACKGROUND OF THE INVENTION

1. Field of the Invention

This invention relates to a method for producing an electrochromic device.

2. Prior Art

An electrochromic device is generally produced by sealing the periphery, except for a portion thereof, of a pair of electrically conductive substrates, at least one of which is transparent, placed in a spaced-apart opposing relationship so as to assemble a cell having an injection port formed by the unsealed portion and filling the inner space of the cell by charging through the port an electrolyte or the precursor thereof in a vacuum. The injection port of the cell is then sealed by filling and curing therein a photo-setting or thermosetting acrylic resin or epoxy resin adhesive.

However, such a method for sealing or closing the port requires a step of removing the electrolyte adhered around the injection port prior to filling the adhesive. If the electrolyte is not removed completely, the adhesive can not seal the port sufficiently. Furthermore, the above sealing method fails to obtain satisfactory sealing strength due to an insufficient cure of the adhesive caused by the contact thereof with the electrolyte.

Japanese Laid-Open Patent Publication Nos. 2-114237 and 6-250230 disclose a two-step sealing method to solve the foregoing problems.

Japanese Laid-Open Patent Publication No. 2-114237 discloses a method which comprises a primary sealing and a secondary sealing. In this method, first of all, there is prepared a cell having an opening formed in a selected portion of the peripheral edges of a pair of substrates in opposing relation. After an electrolyte is charged through the opening, the primary sealing is conducted by coating an epoxy resin adhesive to the opening while an external pressure is vertically applied to the substrates followed by releasing the pressure to allow the sealant to enter into the inside of the opening and cure therein. After a certain period of time, the secondary sealing is carried out by coating an epoxy resin adhesive on the peripheral edges of the substrate including the primary sealed portion and allowing the adhesive to cure itself.

This method is recognized as being applicable to the production for a electrochromic device of a relatively small size. However, the method is not always suitable for the production for an electrochromic device of a relatively large size because the primary sealing requires the process of applying an external pressure onto the cell. Furthermore, this two-step sealing method is mainly focused on the injection port (opening) provided on the end surface of the cell. Therefore, when this method is employed for producing the large electrochromic device, there may arise a risk that the adhesive would peel off due to the stress applied to the sealing portion upon transportation of the device even though the sealing is completed in a satisfactory manner.

Japanese Laid-Open Publication No. 6-250230 proposes a method in which an electrolyte injection port is sealed with a radiation-cure type adhesive and then sealed with an epoxy resin adhesive so as to be overlapped with the former adhesive. However, with this method the above risk can not be removed because it also attempts to solve the above problem by providing the electrolyte injection port in the end surface of the cell.

An object of the invention is to provide a method for producing an electrochromic device whose sealing portion of the electrolyte injection port is free from the peel off of the adhesive by providing the electrolyte injection port in one of the two opposing substrates, not in the peripheral edge of the cell, even upon the production of a large size electrochromic device on which stress would possibly applied during the transportation of the device.

Another object of the invention is to provide a method for producing an electrochromic device. The method can avoid completely the contact between an electrolyte and an adhesive to be used for sealing the electrolyte injection port and thus is also free from a risk that the curing reaction of the adhesive is hindered.

SUMMARY OF THE INVENTION

According to the invention, there is provided a method for producing an electrochromic device which comprises:

(a) a step of assembling a hollow cell constituting an electrochromic device by sealing together the entire peripheral edges of two electrically conductive substrates, at least one of which is transparent, disposed in a spaced-apart opposing relationship with each other and each having an opening identical in shape and position to that of the opposed substrate;

(b) a step of inserting into one of the openings an elastically deformable sealing member which is sufficient in size and length to close both of the openings;

(c) a step of filling the inside of the hollow cell by vacuum-injecting an electrolyte or the precursor thereof through the other opening which remains open;

(d) a step of pushing the sealing member up to the opening for injecting the electrolyte or the precursor so as to close this opening as well; and (e) a step of bonding the sealing member extending through the two openings to each of the substrates with an adhesive.

BRIEF DESCRIPTION OF THE SEVERAL VIEWS OF THE DRAWINGS

The drawings shown in FIGS. 1–3 are described briefly below.

DETAILED DESCRIPTION OF THE INVENTION

Figure 1:
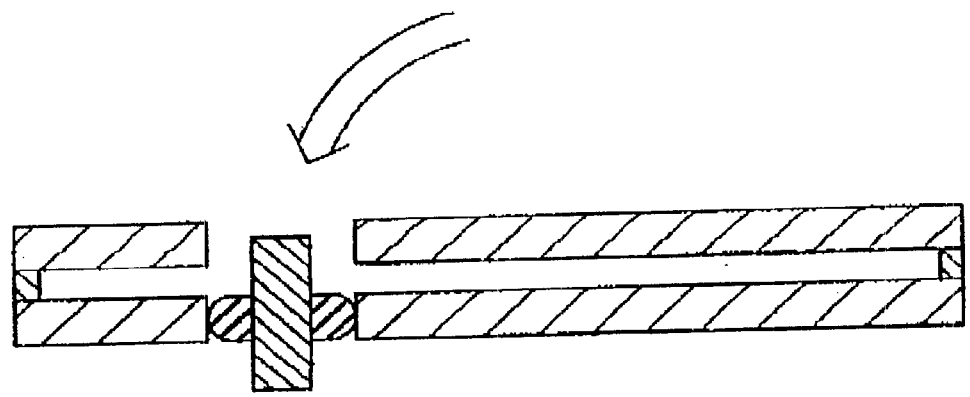
FIG. 1 is a cross-sectional side view showing two electrically conductive substrates and an elastically deformable sealing member of an electrochromic device produced by the present invention, where the arrow shows the insertion direction of the sealing member into one of the identical openings in the two substrates.

An electrically conductive substrate used for the inventive method means literally a substrate functioning as an electrode. The electrically conductive substrate may be that of which substrate itself is electrically conductive or that of which is not electrically conductive but has an electrode layer disposed on the surface contacting the layer of an electrolyte.

Such an electrically conductive substrate may be iron, copper, silver, aluminum, tin, lead, gold and zinc and alloys thereof. The non-electrically conductive substrate may be any type of substrate as long as it has a smooth surface. Specific examples are substrates made of a material such as plastics (synthetic resin), glass, wood and stone.

The electrochromic device produced by the invention includes a pair of such electrically conductive substrates one of which is necessarily transparent. Such an electrically conductive transparent substrate may be produced by laminating an electrode layer on a transparent substrate. The transparent substrate may be colored or colorless glass as well as colored or colorless plastics (synthetic resin). Eligible plastics for this purpose are polyethylene terephthalate, polyamide, polysulfone, polyether sulfone, polyether etherketone, polyphenylene sulfide, polycarbonate, polyimide, polymethyl methacrylate and polystyrene.

The term "transparent" used herein designates optical transmission ranging from 10 to 100%. The substrate used for the invention may be flat or curved and may be deformable by stress as long as it has a smooth surface at room temperature.

It is preferred that the electrode layer to be laminated on the non-electrically conductive substrate is transparent. It is requisite that at least the electrode layer to be laminated on the transparent substrate is transparent. Eligible for the electrode layer are a thin film of metal such as gold, silver, chrome, copper and tungsten or a metal oxide such as ITO ($In_2O_8$—$SnO_2$), tin oxide, silver oxide, zinc oxide and vanadium oxide, The thickness of the electrode is selective within the range of usually 10 to 1,000, preferably 50 to 300 nm. The surface resistance of the electrode may be selected suitably but usually in the range of 0.5–500, preferably 1–50 $\Omega$/sq.

No particular limitation is imposed on the formation method of the electrode layer. Any suitable conventional methods may be selected depending upon the metal and metal oxide constituting the electrode. In general, the formation of the electrode layer is carried out by vacuum evaporation, Ion plating, sputtering and a sol-gel method. In any case, the formation of the electrode should be conducted while maintaining the temperature Of the substrate within the range of 100–350° C.

The electrode layer may partially provided with an opaque electrode-activator in order for the purpose of imparting oxidation-reduction capability and increasing electric double layer capacitance. In this case, if it is necessary to maintain the transparency of the electrode, the optical transmission of the whole electrode is kept within the range of 10–100%.

Electrode activators eligible for the purpose of the invention include a metal such as copper, silver, gold, platinum, iron, tungsten, titanium and lithium, an organic material having oxidation-reduction capability such as polyaniline, polythiophen, polypyrrole and phthalocyanine, a carbon material such as active carbon and graphite and a metal oxide such as $V_2O_5$, $WO_3$, $MnO_2$, NiO and $Ir_2O_3$ and mixtures thereof. These electrode activators may be integrated to the electrode with a binder resin.

The opaque electrode activator may be applied onto an electrode by forming over an ITO transparent electrode a composition comprising an active carbon fiber, graphite and an acrylic resin in the shape of stripes or by forming on a thin-film of gold (Au) a composition comprising $V_2O_5$, acetylene black and butyl rubber in a meshed pattern.

As indicated in FIG. 1, the two sheets of electrically conductive substrates used for the inventive method each have the same shape of opening at the same location of the substrates. Meant by "the same location" referred herein is that the centers of the two openings are aligned with each other when the two substrates are opposed such that the electrodes thereof face each other. The opening usually takes a round shape. The size of the opening may be selected from the range of 0.5–10 mm Ø, preferably 2–6 mm Ø.

The cell for the electrochromic device according to the invention, as shown in FIG. 1, is produced by opposing the two electrically conductive substrates (one of which is transparent) each having an opening identical in shape and location to those of the other substrate, in a spaced-apart relation and sealing the whole peripheral edges of the opposed substrates. If the electrically conductive substrate is one obtained by laminating an electrode layer thereon, the electrode layer is placed to face the inside of the cell. The space between the opposed substrates is within the range of usually 30–1,000, preferably 200–500 $\mu$m.

Needless to mention, an electrochromic device contains an electrochromic material. Such an electrochromic material may be mixed in an electrolyte layer or formed into the electrochromic layer separately from the electrolyte layer The electrochromic layer may be arranged anywhere the inside of the cell. In general, prior to the assembly of the cell, the electrochromic layer may be arranged on at least one or both of the electrode layers on the electrically conductive substrates. When the electrochromic material is mixed into the electrolyte layer, there may be employed a method in which to inject the mixture of an electrolyte or the precursor thereof and the electrochromic material into the cell.

The electrochromic material may be exemplified by substances colored, bleached or discolored by electrochemical oxidation or reduction such as $Mo_2O_3$, $Ir_2O_3$, NiO, $V_2O_5$, $WO_3$, biologen, polythiophene, polyaniline, polypyrrole, metal phthalocyanine and ferrocene.

The electrochromic layer may be formed solely from the electrochromic material or may be formed from the electrochromic material and the matrix component thereof, the former being preferred The electrochromic layer has a thickness in the range of usually 10 nm–1 $\mu$m, preferably 50–800 nm.

There may be employed any conventional method for forming the electrochromic layer such as vacuum evaporation, ion-plating, sputtering, electrolytic polymerization, dip coating and spin coating.

No particular limitation imposed on a sealant used for sealing the peripheral edges of the opposed electrically conductive substrates as long as it can seal up the device so as to isolate the interior thereof from its surroundings and so as to prevent a component such as moisture, oxygen and carbon monoxide adversely effecting the performances of the device from permeating into the interior of the device. Therefore, eligible sealants are exemplified by synthetic resins induding polyester such as polyethylene terephtalate, polyamide, polysulfone, polyether sulfone, polyether etherketone, polyphenylene sulfide, polycarbonate, polyimide, polymethyl methacrylate, polystyrene, tricellulose acetate, polymethyl pentene, polysiloxane, polyethylene, polypropylene, polycellulose acetate, phenolic resin, urea resin, epoxy resin, polyvinyl acetate, polyvinyl acetal, polyvinyl alcohol, acrylic and methacrylic esters, cyanoacrylate and polyamide; natural rubber; and synthetic rubbers such as isoprene rubber, butadiene rubber, styrene-butadiene rubber, butyl rubber, ethylene-propylene rubber, chloropylene rubber, chlorosulfonated polyethylene, nitrile rubber, urethane rubber, polysulfide rubber, acrylic rubber, epichlorohydrin rubber, silicone rubber, fluorine rubber and hydrogenated nitrile rubber.

Alternatively, hardening resins are also eligible for the sealant. There is no particular limitation to the hardening resins and thus various hardening type of resins are eligible such as those cured by heat and electromagnetic ray. Eligible hardening resins are phenolic resin, urea resin, epoxy resin, polyvinyl acetate, polyvinyl acetal, polyvinyl alcohol, acrylic and methacrylic esters, cyanoacrylate and polyamide. These may be used singular or in combination. Further alternatively, these resins may be modified by adding fillers. Among these, particularly preferred are an epoxy resin and an acrylic-modified epoxy resin. Preferred acrylic-modified epoxy resins are those containing 0.01–0.3 mol of acrylic residue per mol of epoxy residue, preferably 0.05–0.2 mol of acrylic residue per mol of epoxy residue.

When the peripheral edges of the opposed electrically conductive substrates are sealed, it Is preferred to use a spacer for adjusting the width of the space between the substrates. The spacer needs to be non-electrically conductive but may have sheet-, sphere-, fiber- or bar-like shape.

There may be employed any suitable method for sealing the electrically conductive substrates such as the following methods:

(1) Inserting the sealing material having been processed and formed in conformity with the shape of the electrically conductive substrates therebetween;

(2) Coating the above-mentioned hardening resin paste in a desired shape over the surface of the substrate using a known printing method;

(3) Coating the sealant over the surface of the substrate; and (4) Forming the sealant discharged from a nozzle into a suitable pattern on the substrate by moving the nozzle.

Among these, particularly preferred is method (4).

The sealant may be applied to either one or both of the substrates.

When the hardening resin is applied to the substrate, it is hardened after the substrates are laminated. Needless to mention, the hardening is effected depending on the resin used.

If a thermal-hardening resin is used, there may be used such a resin hardening at room temperature. If a thermal-hardening resin requiring heat to be hardened is used, it is selected from the resins which harden at a temperature ranging from room temperature to 150° C., preferably from room temperature to 100° C. The period of time required for hardening is selected to an extent that electrochromic characteristics are not adversely effected, preferably from the range within 24 hours, more preferably from the range within one hour.

If a photo-hardening resin is employed, there may be used various types of light sources as long as they initiate the photo-hardening. Such a light source may be exemplified by low-, high- and ultrahigh-voltage mercury lumps, a xenon lump and an incandescent lamp and laser beams. The hardening of the resin may be conducted by exposing the entire surfaces of the device after being applied with the resin to light such that the resin is hardened simultaneously. Alternatively, the photo-hardening may be effected in a step by step manner by scanning a focused spot light over the resin, for example, by moving a light source or using a photoconductive material such as an optical fiber. This may be repeated more than twice.

Figure 2:
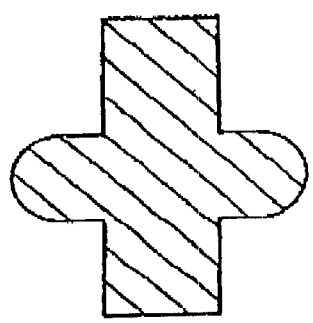
FIG. 2 is a cross-sectional end view of one embodiment of a sealing member used in the present invention.
Figure 3:
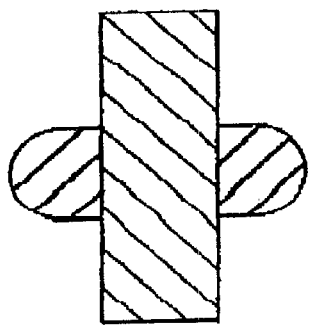
FIG. 3 is a cross-sectional end view of an alternative embodiment of a sealing member used in the present invention.

Into the inside of the cell produced in the above-described manner, an electrolyte or the precursor thereof is injected in a vacuum. According to the invention, prior to such injection, the opening of either one of the two electrically conductive substrates are sealed or closed by inserting a sealing member. This sealing member is pushed up to the other opening to close it up upon completion of the injection of the electrolyte into the cell. Therefore, the sealing member used for the present invention has a length substantially corresponding to the thickness of the cell in the vertical direction with respect to the electrically conductive substrate. The sealing member is provided on an arbitrary portion, usually center of the longitudinal outer peripheral surface with a ring-shaped protrusion or an O-shaped ring which are deformable by stress. FIG. 2 depicts the sealing member with a ring-shaped protrusion, while FIG. 3 shows the sealing member with an O-shaped ring. The outer diameter of the sealing member measured at the ring-shaped protrusion or O-shaped ring is 0.1–2 mm, preferably 0.2–1.0 mm larger than the diameter of the opening of the electrically conductive substrate.

In the present invention, the ring-like protrusion or the O-shaped ring of the sealing member closes each of the openings of the two electrically conductive substrates from the inside of the cell. When an electrolyte or the precursor thereof is injected into the cell, the ring-like protrusion or the O-shaped ring closes the opening of either one of the two substrates. In this state, the ring-like protrusion or the O-shaped ring functions as a stopper preventing the electrolyte or the precursor from leaking out the cell. The ring-like protrusion or the O-shaped ring is usually 0.05–1.5 mm, preferably 0.3–1 mm in thickness in the longitudinal direction of the sealing member. It is desirable that the thickness is equivalent to or slightly larger than the space between the opposed substrates.

The main body of the sealing member (excluding the ring-like protrusion or the O-shaped ring) may be made of any suitable material as long as they are resistant to the electrolyte or the precursor thereof and may not be resilient. A first example of eligible material for the sealing member includes materials which are poor in resiliency or have no resiliency at all, for example, plastics such as carbon fiber and polypropylene and stainless steel. A second example includes natural rubbers or synthetic rubbers which are inherently resilient. Such synthetic rubbers are exemplified by isoprene rubber, butadiene rubber, styrene-butadiene rubber, butyl rubber, ethylene-propylene rubber, chloroprene rubber, chlorosulfonated polyethylene, nitrile rubber, urethane rubber, polysulfide rubber, acrylic rubber, epichlorohydrin rubber, silicone rubber, fluorine rubber, hydrogenated nitrile rubber and the like.

The ring-like protrusion or the O-shaped ring is usually made of a natural rubber or a synthetic rubber. The ring-like protrusion or the O-shaped ring may be formed integrally with the sealing member or may be bonded thereto after being formed.

An electrolyte or the precursor thereof may be injected in a vacuum into the cell while both of the openings are left open and then these openings may be closed at once by inserting the sealing member.

According to the invention, an electrolyte or the precursor thereof is vacuum-injected into the cell having two openings provided in the substrates through one of the openings while the other opening being dosed or sealed by the sealing member. Hereinafter, the descriptions are made with respect to the electrolyte and the precursor thereof.

Although the electrolyte used for the electrochromic device produced by the inventive method may be any type of electrolytes as long as they can color and bleach the electrochromic material contained in the device, preferred are those having an ion conductivity of more than $1 \times 10^{-7}$ S/cm at room temperature. The electrolyte may be of liquid, gel or solid. Solid electrolytes are particularly preferred for the purpose of the invention.

Eligible liquid electrolytes are those dissolving a supporting electrolyte such as salts, acids and alkalis in a solvent. Any suitable solvents may be used as long as they can dissolve the supporting electrolyte. Particularly preferred are those having polarity. Specific examples of such a solvent include water and organic polar solvents such as methanol, ethanol, propylene carbonate, ethylene carbonate, dimethylsulfoxide, dimethoxyethane, acetonitrile, r-butyrolactone, r-valerolactone, sulforan, 1,3-dioxane, N,N-dimethylformamide 1,2-dimethoxyethane and tetrahydrofuran. Preferred are propylene carbonate, ethylene carbonate, dimethylsulfoxide, dimethoxyethane, acetonitrile, r-butyrolactone, sulforan, 1,3-dioxolane, N,N-dimethylformamide, 1,2-dimethoxyethane and tetrahydrofurun. These may be used singular or in combination.

Although not restricted, salts used as the supporting electrolyte may be alkali metal salts, inorganic ion salts such as alkali earth metal salts, quaternary ammonium salts and cydic quaternary ammonium salts. Specific examples of such salts include alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBR$, $(C_2H_5)_4NClO_4$ and $(n-C_4H_9)_4NClO_4$ and mixtures thereof.

Acids used as the supporting electrolyte may be exemplified by inorganic acids and organic acids which include sulfuric acid, hydrochloric acid, phosphoric acid, sulfonic acid carboxylic acid.

Alkalis used as the supporting electrolyte include sodium hydroxide, potassium hydroxide and lithium hydroxide.

The gelatinized-liquid electrolyte may be those which are gelatinized or made to be viscous by adding a polymer or a gelatinizer to the above-mentioned liquid electrolytes.

Preferred examples of such a polymer are polyacrylonitrile, carboxymethylcellulose, polyvinyl chloride, polyethylene oxide, polyurethane, polyacrylate, polyamide, polyacrylamide, cellulose, polyester, polypropyleneoxide and nafion.

Preferred examples of the gelatinizer are oxyethylenemethacrylate, oxyethyleneacrylate, urethaneacrylate, acrylamide and agar-agar.

The gelatinized-liquid electrolyte is sandwiched between the opposed electrically conductive substrates by injecting into the cell the mixture of h the precursor monomer of a polymer or the precursor of the gelatinizer and a liquid electrolyte then and then polymerizing or gelatinizing the mixture.

There is no particular limitation to the solid electrolyte if it is solid at room temperature and ion conductive Preferred examples of such solid electrolyte are polyethyleneoxide, the polymer of oxyethylenemethacrylate, nafion, polystyrene sulfonate, $Li_3N$, $Na-\beta-Al_2O_3$ and $In(HPO_4)_2H_2O$. Particularly preferred are polymeric solid electrolytes derived from polymerization of a polyethyleneoxide-based compound, an oxyalkyleneacrylate-based compound or a urethaneacrylate-based compound used as the main component of the precursor.

A first example of such a polymeric solid electrolyte is one obtained by solidifying a composition (hereinafter referred to as Composition A) which is used as a precursor and comprises an organic polar solvent, a supporting electrolyte and a urethaneacrylate represented by the formula

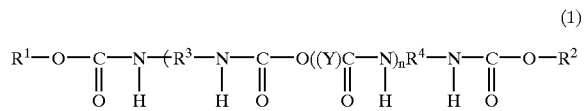

(1)

wherein $R^1$ and $R^2$ may be the same or different and are each a group of formula (2), (3) or (4), $R^3$ and $R^4$ may be the same or different and are each a $C_1$–$C_{20}$, preferably $C_2$–$C_{12}$ divalent hydrocarbon residue, Y is selected from a polyether unit, a polyester unit, a polycarbonate unit and the mixed unit thereof and n is an integer of 1–100.

Formulae (2), (3) and (4) are represented by

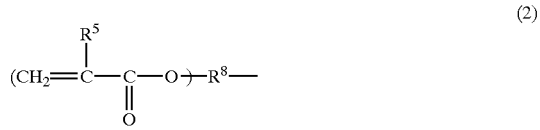

(2)

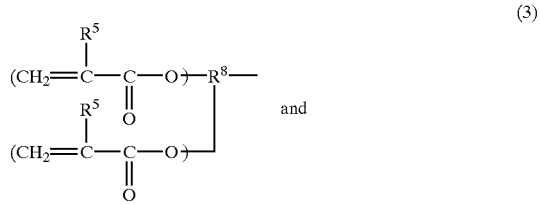

(3)

and

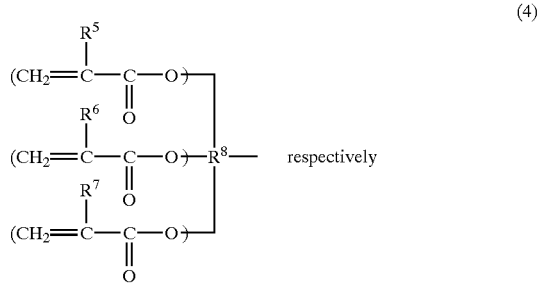

(4)

respectively wherein $R^5$, $R^6$ and $R^7$ may be the same or different and are each a hydrogen atom or a $C_1$–$C_3$ alkyl group and $R^8$ is a $C_1$–$C_{20}$, preferably $C_2$–$C_8$ organic residue of divalent through quatervalent. Such organic residues may be a hydrocarbon residue such as alkyltolyl, alkyltetratolyl and alkylene of the formula

(5)

wherein $R^9$ is a $C_1$–$C_3$ alkyl group or hydrogen, p is an integer of 0–6 and if p is greater than 2 the groups of $R^9$ may be the same or different.

The hydrocarbon residue may be a group part of which hydrogen atoms are substituted by an oxygen-containing hydrocarbon group such as a $C_1$–$C_6$, preferably $C_1$–$C_3$ alkoxy group and a $C_6$–$C_{12}$ aryloxy group. Specific examples of group $R^8$ in formulae (2) thorough (4) are those represented by the following formulae:

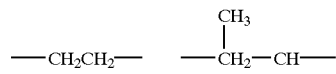

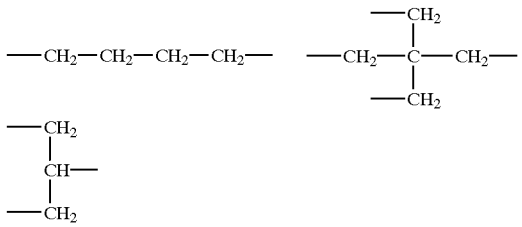

Each of the divalent hydrocarbon residues represented by $R^3$ and $R^4$ in formula (1) is exemplified by a divalent chain-like hydrocarbon group, an aromatic hydrocarbon group and an alicyclic-containing hydrocarbon group. Specific examples of the chain-like divalent hydrocarbon group are those represented by formulae (6) through (8)

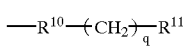 (6)

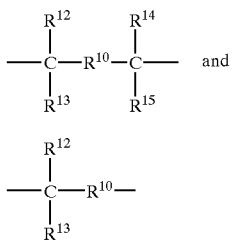

wherein $R^{10}$ and $R^{11}$ may be the same or different and are each a phenylene group, a phenylene group having an alkyl subsutituent, a cycloalkylene group and a cycloalkylene group having an alkyl substituent, $R^{12}$, $R^{13}$, $R^{14}$ and $R^{15}$ may be the same or different and each are a hydrogen atom or a $C_1$–$C_8$ alkyl group and q is an integer of between 1 and 5.

Specific examples of the groups $R^3$ and $R^4$ in formula (1) are those represented by the following formulae $CH_2CH_2CH_2CH_2CH_2CH_2$ (9)

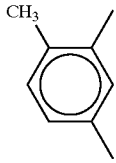 (10)

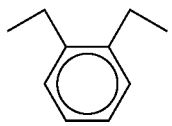 (11)

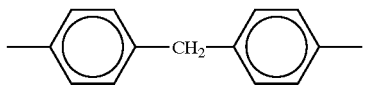 (12)

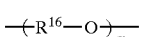 (13)

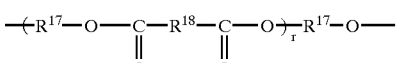 (14)

and

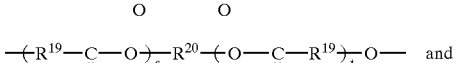 (15)

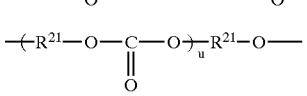.

In formula (1), Y indicates a polyether unit, a polyester unit, a polycarbonate unit and mixed unit thereof. Each of these units is represented by the following formulae:

$$-\!\!\left(\!R^{16}\!-\!O\!\right)_{\!m}\!\!- \quad (a)$$

$$-\!\!\left(\!R^{17}\!-\!O\!-\!\underset{\underset{O}{\|}}{C}\!-\!R^{18}\!-\!\underset{\underset{O}{\|}}{C}\!-\!O\!\right)_{\!r}\!\!R^{17}\!-\!O\!- \quad (b)$$

$$-\!\!\left(\!R^{19}\!-\!\underset{\underset{O}{\|}}{C}\!-\!O\!\right)_{\!s}\!\!R^{20}\!\!\left(\!O\!-\!\underset{\underset{O}{\|}}{C}\!-\!R^{19}\!\right)_{\!t}\!\!O\!- \quad \text{and} \quad (c)$$

$$-\!\!\left(\!R^{21}\!-\!O\!-\!\underset{\underset{O}{\|}}{C}\!-\!O\!\right)_{\!u}\!\!R^{21}\!-\!O\!- \quad (d)$$

wherein $R^{16}$ through $R^{21}$ may be the same or different and are each a $C_1$–$C_{20}$, preferably $C_2$–$C_{12}$ divalent hydrocarbon residue, $C_1$–$C_6$ being particularly preferred for $R^{19}$, m is an integer of 2–300, preferably 10–200, r is an integer of 1–300, preferably 2–200, s is an integer of 1–200, preferably 2–100, t is an integer of 1–200, preferably 2–100 and u is an integer of 1–300, preferably 10–200.

$R^{16}$ through $R^{21}$ are preferably straight or branched alkylene groups among which methylene, ethylene, trimethylene, tetramethylene, pentamethylene, hexamethylene and propylene groups are preferred for $R^{18}$, and ethylene and propylene groups are preferred for $R^{16}$, $R^{17}$ and $R^{19}$ through $R^{21}$.

Each unit represented by formulae (a) through (d) may be a copolymer of the same or different units. In other words, if there exist a plurality of the groups of each $R^{16}$ through $R^{21}$, the groups of each $R^{16}$, $R^{17}$, $R^{18}$, $R^{19}$, $R^{20}$ and $R^{21}$ may be the same or different. Preferred examples of such copolymers include a copolymer of ethylene oxide and a copolymer of propylene oxide.

In formula (1), n is preferably an integer of 1–50, more preferably 1–20. The urethaneacrylate of formula (1) has a molecular weight in the range of 2,500–30,000, preferably 3,000–20,000.

The urethaneacrylate has preferably 2–6, more preferably 2–4 functional groups per molecule.

The urethaneacrylate may be prepared by any suitable conventional methods.

There is no limitation to the organic polar solvent contained in Composition (A) as long as it has a polarity and can dissolve the electrolyte. Preferred are propylene carbonate, ethylene carbonate, butylene carbonate, γ-butyrolactone, sulfolane, 1,3-dioxane, N,N-dimethylformamide, 1,2-dimethoxyethane, acetonitrile and tetrahydrofuran. These solvents may be used singular or in combination. The organic polar solvent is added in an amount of 100–1,200, preferably 200–900 weight parts per 100 parts of the urethaneacrylate. Too less amount of adding the organic polar solvent results in insufficient ion conductivity, while too much amount causes a reduction in mechanical strength.

The supporting electrolyte contained In Composition (A) is selected depending on the usage of the device. Generally, the above-described liquid electrolytes are preferably used. The supporting electrolyte should be added in an amount of 0.1–30, preferably 1–20 weight percent of the organic polar solvent.

The first example of the solid polymeric electrolyte is essentially obtained by solidifying Composition (A) (precursor) composed of the urethaneacrylate, the organic polar solvent and the supporting electrolyte. If necessary, Composition (A) may be added with any suitable components as long as they are not obstructive to the achievement of the purpose of the invention. Such components may be crosslinkers and photo- or thermal-initiators for polymerization (light or heat).

Composition (A) is injected through the opening of one of the electrically conductive substrates disposed, facing each other to from a cell and then is cured in a conventional manner such that the first example of the solid polymeric electrolyte is sandwiched between the electrically conductive substrates. The term "curing" used herein designates a state where the component is cured with the progress of polymerization (polycondensation) or crosslinking and thus the composition in its entirely does not flow at room temperature. The urethaneacrylate has the basic structure in the form of network by curing.

A second example of the polymeric solid electrolyte is obtained by solidifying a composition (hereinafter refereed to as Composition (B)) which is used as a precursor and comprising an organic polar solvent, a supporting electrolyte, a monofunctional acryloyl-modified polyalkylene oxide and/or a polyfunctional acryloyl-modified polyalkylene oxide.

The mono-functional acryloyl-modified polyalkylene oxide is represented by the formula

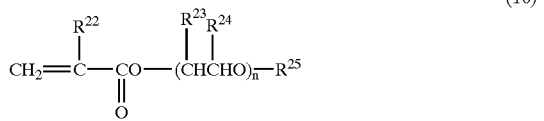

(16)

wherein $R^{22}$, $R^{23}$, $R^{24}$ and $R^{25}$ may be the same or different and each are hydrogen and an alkyl group having 1–5 carbon atoms and n is an integer greater than 1.

Specific examples of such alkyl group include methyl, ethyl, i-propyl, n-propy, n-butyl, t-butyl and n-pentyl. Preferred for $R^{22}$, $R^{23}$ and $R^{24}$ are hydrogen and a methyl group. Preferred for $R^{25}$ are hydrogen, a methyl and ethyl group.

n in formula (16) is an integer greater than 1, usually between 1 and 100, preferably 2 and 50, more preferably 2 and 30.

Specific examples of compounds represented by formula (16) are those having 1–100, preferably 2–50, more preferably 1–20 oxyalkylene units, such as methoxypolyethylene glycol methacrylate, methoxypolypropylene glycol methacrylate, ethoxypolyetylene glycol methacrylate, ethoxypolypropylene glycol methacrylate, methoxypoly-ethyiene glycol acrylate, methoxypolypropylene glycol acrylate, ethoxypolyethylene glycol acrylate, ethoxypolypropylene glycol acrylate and mixtures thereof.

If n is greater than 2, the compound may be those having different oxyalkylene units, that is, copolymerized oxyalkylene units which for instance have 1–50, preferably 1–20 oxyethylene units and 1–50, preferably 1–20 oxypropylene units. Specific examples of such compounds are (ethylene.propylene)glycol methacrylate, ethoxypoly (ethylene.propylene)glycol methacrylate, methoxypoly (ethylene.propylene)glycol methacrylate, methoxypoly (ethylene.propylene)glycol acrylate, ethoxypoly methoxypoly (ethylene.propylene)glycol acrylate and mixtures thereof.

Eligible polyfunctional acryloyl-modified polyalkylone oxide for Composition (B) is a bifunctional acryloyl-modified polyalkylene oxide or a polyfunctional acryloyl-modified polyalkylene oxide having more than three functional groups. The bifunctional acryloyl-modified polyalkylene oxide is represented by the formula

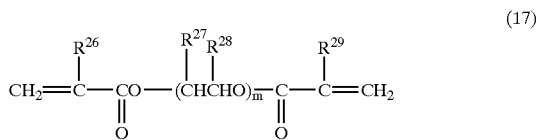

(17)

wherein $R^{26}$, $R^{27}$, $R^{28}$ and $R^{29}$ are each hydrogen and a $C_1$–$C_5$ alkyl group and m is an integer greater than 1. The polyfunctional acryloyl-modified polyalkylene oxide having more than three functional groups is represented by the formula

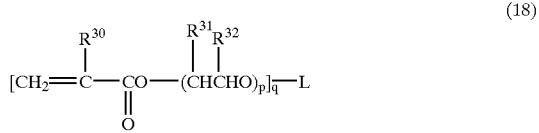

(18)

wherein $R^{30}$, $R^{31}$ and $R^{32}$ each are hydrogen and a $C_1$–$C_5$ alkyl group, p is an integer greater than 1, q is an integer of 2–4 and L is a connecting group of valence indicated by q.

If $R^{26}$, $R^{27}$, $R^{28}$ and $R^{29}$ are alkyl groups, such alkyl groups may be methyl, ethyl, i-propyl, n-propyl, n-butyl, t-butyl, t-butyl and n-pentyl. Preferred for $R^{26}$, $R^{27}$, $R^{28}$ and $R^{29}$ are hydrogen and a methyl group.

m in formula (17) is an integer greater than 1, usually 1–100, preferably 2–50, more preferably 2–30. Preferred examples of compounds of formula (17) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If m is greater than 2, the compounds of formula (17) may be those having different oxyalkylene units, that is, polymerized oxyalkylene unit having 1–50, preferably 1–20 oxyethylene units and 1–50, preferably 1–20 oxypropylene units, such as poly(ethylene.propylene)glycol dimethacrylate, poly(ethylene.propylene)glycol diacrylate and mixtures thereof.

If $R^{30}$, $R^{31}$ and $R^{32}$ are alkyl groups, preferred are methyl, ethyl, i-propyl, n-propyl, n-butyl, t-butyl and n-pentyl groups. Particularly preferred for $R^{30}$, $R^{31}$ and $R^{32}$ are hydrogen and a methyl group.

p in formula (18) is an integer of usually between 1 and 100, preferably 2 and 50, more preferably 2 and 30.

q in formula (18) is a number of connecting group "L" and an integer between 2 and 4.

Connecting group "L" is a divalent, trivalent or quatravalent hydrocarbon group having 1–30, preferably 1–20 carbon atoms.

Such divalent hydrocarbon groups may be alkylene, arylene, arylalkylene, alkylarylene and hydrocarbon groups having those groups as the base skeleton. Specific examples of such hydrocarbon groups are those represented by the following formulae:

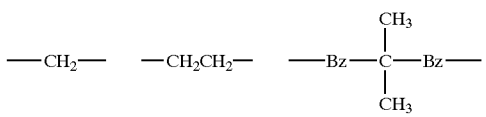

(Bz represents a benzene ring).

Such trivalent hydrocarbons groups may be alkyltryl, aryltryl, arylalkyltryl, alkylaryltryl and hydrocarbon groups having those groups as the base skeleton. Specific examples of such hydrocarbon groups are those represented by the following formulae:

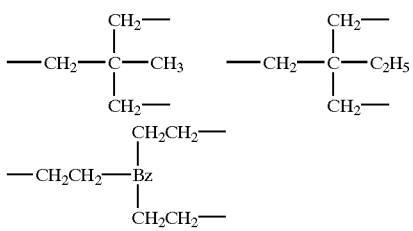

The quatravalent hydrocarbon group may be alkyltetraryl, aryltetraryl, arylalkyltetraryl, alkylaryltetraryl or hydrocarbon groups having those groups as the base skeleton. Specific examples are those represented by the following formulae

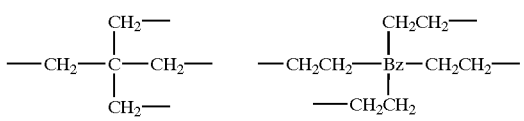

Specific examples of compounds of formula (18) are those having 1–100, preferably 2–50, more preferably 1–20 of an oxyalkylene units such as
trimethylolpropanetri(polyethylene glycol acrylate),
trimethylolpropanetri (polyethylene glycol methaacrylate),
trimethylolpropanetri (polypropylene glycol acrylate),
trimethylolpropanetri (polypropylene glycol methaacrylate),
tetraethylolmethanetetra(polyethylene glycol acrylate),
tetramethylolmethanetetra (polyethylene glycol methaacrylate),
tetramethyolmethanetetra(polypropylene glycol acrylate),
tetramethylolmethanetetra(polypropylene glycol methaacrylate),
2,2-bis[4-(acryloxypolyethoxy)phenyl]propane,
2,2-bis[4-(methaacryloxypolyethoxy)phenyl]propane,
2,2-bis[4-(acryloxypolyisopropoxy)phenyl]propane,
2,2-bis[4-(methaacryloxypolyisopropoxy)phenyl]propane and mixtures thereof.

If p is more than 2, compounds of formula (18) may be those having different oxyalkylene units, that is, polymerized oxyalkylene units having 1–50, preferably 1–20 of oxyethylene units and 1–50, preferably 1–20 oxypropylene units. Specific examples of such compounds include trimethylolpropanetri(poly(ethylene.propylene)glycol acrylate), trimethylolpropanetri(poly(ethylene.propylene) glycol methaacrylate), tetramethylolmethanetetra(poly (ethylene.propylene)glycol acrylate), tetramethylolmethanetetra(poly(ethylene.propylene)glycol methaacrylate) and mixtures thereof.

Needless to mention, there may be used the difunctional acryloyl-modified polyalkyleneoxide of formula (17) and the polyfunctional acryloyl-modified polyalkyleneoxide of formula (18) in combination. When these compounds are used in combination, the weight ratio of the compound of formula (17) to that of formula (18) is in the range between 0.01/99.9 and 99.9/0.01, preferably 1/99 and 99/1, more preferably 20/80 and 80/20. When the compound of formula (16) is used in combination with the compound of formula (17) or (18), the weight ratio therebetween is in the range of usually between 1/0.001 and 1/1, preferably 1/0.05 and 1/0.5.

The organic polar solvent and supporting electrolyte described with respect to Composition (A) are also eligible for Composition (B). The organic polar solvent should be added in an amount of 50–800, preferably 100–500 weight percent based on the total weight of the monofunctional acryloyl-modified polyalkyleneoxide and the polyfunctional acryloyl-modified polyalkyleneoxide.

The supporting electrolyte should be added in an amount of 1–30, preferably 3–20 weight percent based on the total weight of the monofunctional acryloyl-modified polyalkyleneoxide and the polyfunctional acryloyl-modified polyalkyleneoxide.

If necessary, Composition (B) may be added with another components optionally as long as they do not bother the achievement of the purpose of the invention. Such components may be photopolymerization initiators or thermal polymerization initiators. These initiators should be added in an amount of 0.05–5, preferably 0.01–3 weight percent based on the total weight of the monofunctional acryloyl-modified polyalkyleneoxide and the polyfunctional acryloyl-modified polyalkyleneoxide.

Composition (B) is injected through the opening of one of the electrically conductive substrates disposed, facing each other to from a cell and then is cured in a conventional manner so that the second example of the solid polymeric electrolyte is sandwiched between the electrically conductive substrates. The term "curing" used herein designates a state where the monofunctional acryloyl-modified polyalkyleneoxide or the polyfunctional acryloyl-modified polyalkyleneoxide is cured with the progress of polymerization (polycondensation) or crosslinking and thus the composition in its entirely does not flow at room temperature. In this case, the monofunctional acryloyl-modified polyalkyleneoxide or the polyfunctional acryloyl-modified polyalkyleneoxide has the basic structure in the form of network.

According to the invention, any of the above-described liquid, gelatinized and solid electrolytes is generally injected into the cell. However, needless to mention, an electrolyte other than the above-described electrolytes may be injected into the cell The gelatinized- and solid-electrolytes are injected into the cell in the form of a precursor. As already described, the electrolyte or the precursor may be added with the electrochromic material beforehand. Upon the injection, there is selected a suitable method which can fill evenly the space between the two electrically conductive substrates with the electrolyte or the precursor. There is usually employed a vacuum injection method in which the interior of the cell is evacuated so as to be ideally vacuumed and then the injection port (opening) of the cell is submerged into the liquid electrolyte or the precursor under atmospheric pressure such that the liquid electrolyte is supplied into the cell by utilizing the difference in pressure between the outside and inside of the cell.

Upon completion of the injection, before the precursor is gelatinized or solidified, the injection port (opening) of the cell is closed or sealed by pushing the sealing member having been inserted into the other opening of the cell, up to the injection port. The electrolyte or the precursor thereof adhered around the injection port is then removed by washing and thereafter the sealing member embedded therein is bonded to the cell with an adhesive. Such an adhesive may be selected from various types of adhesives such as those of photo-, thermal-, room temperature- and electro beam-setting types. As a matter of course, there may be used acrylic-, epoxy- and silicone-resin adhesives as well as other types of adhesives such as phenolic resin, urea resin, epoxy resin, polyvinyl acetate, polyvinyl acetal, polyvinyl alcohol, acrylic and methacrylic esters, cyanoacrylate and polyamide. These may be used singular or in combination. Alternatively, these may be modified or added with fillers.

In view of solvent resistance, the epoxy resin is found to be particularly superior. An acrylic-modified epoxy resin of photo-setting type exhibits is preferred. Preferred for such an acrylic-modified epoxy resin are those having 0.01–0.3 mol, preferably 0.05–0.2 mol of acrylic residue per mol of epoxy residue.

Thermo setting of the adhesive for bonding the sealing member to the cell may be conducted by using various types of heat source such as ovens, infrared heaters, electric heaters and surface type heat generators at a temperature ranging from room temperature to 150° C., preferably room temperature to 100° C. The time required for the thermo-setting is not restricted but is usually within 24 hours, preferably within one hour.

The photo-setting may be conducted by using various types of light sources such as low-, high- and ultrahigh-voltage mercury vapor lamps, a xenon lamp, an incandescent lamp and laser beams. The photo-setting of the adhesive may be conducted by exposing evenly the entire surfaces of the device to light after being applied with the adhesive. Alternatively, a step by step manner may be employed which is effected by scanning a gathered spot light over the device, for example, by moving a lump or a light source or using a photoconductive material such as an optical fiber or a mirror. Practically preferred are methods using a 100 W–1 KW ultrahigh voltage mercury vapor lamp or a xenon-mercury vapor lamp, among which methods preferred are methods which guide the light from a light source of a 200 W–500 W xenon-mercury vapor lamp using an optical fiber.

According to the invention, since the sealing member closing the injection port of the cell can isolate the electrolyte or the precursor thereof injected thereinto from the influence of the outside of the cell, the complete removal of the electrolyte or the precursor thereof adhered around the injection port can be achieved merely by washing, resulting in that the adhesive for bonding the sealing member to the cell is free from the hindrance in adhesive capability caused by being mixed with the electrolyte or precursor thereof. Furthermore, due to the injection port provided in the electrically conductive substrate, the inventive method, even upon the production of large size of electrochromic devices, is not only free from the risk that the sealing member comes out from the cell by the deformation thereof caused by stress and but also is contributive to increase the durability of the sealing member because the sealing member is firmly fixed to the substrate by bonding with the adhesive.

The present invention will now be explained in further detail with reference to Examples, which are given only by way of illustration but are not intended for limiting the invention.

EXAMPLE 1

Preparation of Counterelectrode for Electrochromic Device

A pasty active carbon was prepared by mixing 80 g of active carbon powder manufactured by KURARE under the trade name of YR17, 40 g of graphite manufactured by NIPPON KOKUEN SHOJI CO., LTD. under the trade name of USSP, 343 g of a silicone resin manufactured by NIPPON UNICAR CO., LTD. under the trade name of RZ7703 and 25 g of butyl cellosolve. On an ITO glass substrate (a transparent electrically conductive glass produced by forming a layer having a thickness of 2,500 Å on a glass substrate by sputtering using an $In_2O_3$:Sn target of 10 Ω/sq in electrical surface resistance, 2 mm in thickness and 50 cm×50 cm in size, the above-obtained active carbon paste was screen-printed to form a striped pattern; each stripe is 500 μm in width and 100 μm in height. The printed area was 20% of the total area of the electrode layer. The printed active carbon was cured by heating at a temperature of 180° C. for 90 minutes thereby obtaining a counterelectrode.

Preparation of Electrochromic Electrode for Electrochromic Device

On an ITO glass of 10 Ω/sq in electrical surface resistance, 2 mm in thickness and 50 cm×50 cm in size, a 5,000 Å tungsten oxide film was deposited at room temperature under the condition of 10–30 Å/second to obtain an electrochromic electrode The two substrates (counterelectrode and electrochromic) each were provided with an 4 mmø opening located 1 cm apart from the sides of the substrate. The two substrates were then placed in a 500 μm spaced apart opposing relationship such that their openings face each other, followed by sealing the peripheral edges of the opposed substrates thereby producing a hollow cell. A butyl rubber of 5 mm wide had been applied to the peripheral edges as a primary sealant and a thermo-setting epoxy resin sealant of 5 mm wide as a secondary sealant. The sealants were cured at 90° C. for one hour. After a certain period of time, one of the openings of the cell was closed by inserting thereinto a column-shaped sealing member made of butyl rubber having a length of 4.0 mm and a diameter of 4.2 mmø and provided on its center with a ring-shaped protrusion having a width of 1 mm and a thickness of 0.5 mm and the other opening was left open such that the cell can be communicated with the open air.

An electrolyte solution (1 mol/L concentration) containing a supporting electrolyte of $LiClO_4$ in γ-butyrolactone solvent was deaerated and then charged through the opening into the hollow cell in vacuum. Upon completion of the charging of the electrolyte, the opening was closed by pushing the sealing member until the ring shaped protrusion thereof reached the space between the substrates. After the removal of the electrolyte adhered on the cell surface around the sealing member by washing with an ethanol, the sealing portion was coated with a photo-setting adhesive manufactured by THREE BOND under the trade name of 3025 and then applied to a light of 4,000 mJ by a high voltage mercury vapor lamp such that the adhesive is cured and the bonding of the sealing portion was completed, thereby obtaining an electrochromic device.

The coloring and bleaching test was carried out to measure the change of optical density. First, an electrical voltage of 1.5 V was applied across the electrochromic device for 150 seconds so as to be negative at the elecochromic electrode with respect to the counterelectrode. The electrochromic device was uniformly colored in blue, and the change in optical density at the center of the device was 0.50.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state The electrochromic device was left in an oven at 65° C. and a humidity of 95% for 1,000 hours. The device was taken out from the oven and the peel off at the sealing portion was not observed.

The electrochromic device was placed on 5 cm$^3$ of acrylic supporting members situated under the corners of the device so as to be deformed by its weight for one month The peel off at the sealing portion was not observed.

Coloring and Bleaching Test 633 nm of He—Ne laser beam expanded in diameter to 20 mm by a beam expander was irradiated to the center of the electrochromic device and the transmitted light was measured by using Si photodiode. On applying an electrical voltage for coloration, the transmitted light intensity was measured at intervals of 5 seconds. If the transmitted light intensity at t second after the coloration voltage is applied is expressed by T(t), the change in optical density is defined by the following equation;

Change in Optical Density=log[$T$Bleach/$T(t)$]

(log is common logarithms)

EXAMPLE 2

A photo-setting type electrolyte solution was prepared by mixing 20 weight percent of methoxytetraethylene glycol methacrylate and 0.02 weight percent of DAROCURE 1173 to an electrolyte solution (1 mol/L concentration) containing an LiClO$_4$ electrolyte in asolvent of γ-butyrolactone.

The procedures of charging the electrolyte and sealing the opening (charging port) of Example 1 were followed except for using the above-obtained electrolyte. After completion of the secondary sealing with use of a photo-setting type adhesive, the electrolyte in the cell was cured by a light of 20 J in illumination from a high voltage mercury vapor lamp thereby providing an electrochromic device.

The coloring and bleaching test was carried out to measure the change of optical density. First, an electrical voltage of 1.5 V was applied across the electrochromic device for 150 seconds so as to be negative at the electrochromic electrode with respect to the counterelectrode. The electrochromic device was uniformly colored in blue, and the change in optical density at the center of the device was 0.48.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state.

The electrochromic device was left in an oven at 65° C. and a humidity of 95% for 1,000 hours. The device was taken out from the oven and the peel off at the sealing portion was not observed.

EXAMPLE 3

A cell was prepared by following the procedures of Example 1 except that the space between the substrates was changed to 200 μm and the width and thickness of the ring-shaped protrusion of the sealing member were changed to 0.5 mm, respectively. An electrochromic device was prepared by charging the electrolyte used in Example 1 in vacuum into the cell obtained above and following the rest of the procedures of Example 1.

The coloring and bleaching test was carried out to measure the change of optical density. First, an electrical voltage of 1.5 V was applied across the electrochromic device for 150 seconds so as to be negative at the electrochromic electrode with respect to the counterelectrode. The electrochromic device was uniformly colored in blue, and the change in optical density at the center of the device was 0.50.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state.

The electrochromic device was left in an oven at 65° C. and a humidity of 95% for 1,000 hours. The device is taken out from the oven and the peel off at the sealing portion was not observed.

EXAMPLE 4

An electrochromic device was prepared by following the procedures of Example 1 except that the butyl rubber sealing member having an ring shaped protrusion is replaced with a sealing member having a main body made of stainless steel provided therearound a O-shaped ring of butyl rubber having a thickness of 1 mm and an outer diameter of 4.5 ⌀mm.

The coloring and bleaching test was carried out to measure the change of optical density. First, an electrical voltage of 1.5 V was applied across the electrochromic device for 150 seconds so as to be negative at the electrochromic electrode with respect to the counterelectrode. The electrochromic device was uniformly colored in blue, and the change in optical density at the center of the device was 0.50.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state.

The electrochromic device was left in an oven at 65° C. and a humidity of 95% for 1,000 hours. The device is taken out from the oven and the peel off at the sealing portion was not observed.

The electrochromic device was placed on 5 cm$^3$ of acrylic supporting members situated under the corners of the device so as to be deformed by its weight for one month. The peel off at the sealing portion was not observed.

EXAMPLE 5

An electrochromic device was prepared by following the procedures of Example 2 except that the butyl rubber sealing member having an ring shaped protrusion is replaced with a sealing member having a main body made of stainless steel provided therearound a O-shaped ring of butyl rubber having a thickness of 1 mm and an outer diameter of 4.5 ⌀mm.

The coloring and bleaching test was carried out to measure the change of optical density. First, an electrical voltage of 1.5 V was applied across the electrochromic device for 150 seconds so as to be negative at the electrochromic electrode with respect to the counterelectrode. The electrochromic device was uniformly colored in blue, and the change in optical density at the center of the device was 0.48.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state.

The electrochromic device was left in an oven at 65° C. and a humidity of 95% for 1,000 hours. The device is taken out from the oven and the peel off at the sealing portion was not observed.

EXAMPLE 6

An electrochromic device was prepared by following the procedures of Example 1 except that the space between the substrates was changed to 200 μm and the butyl rubber sealing member having an ring-shaped protrusion is replaced with a sealing member having a main body made of stainless steel provided therearound a O-shaped ring of butyl rubber having a thickness of 1 mm and an outer diameter of 4.5 ømm.

The coloring and bleaching test was carried out to measure the change of optical density. First, an electrical voltage of 1.5 V was applied across the electrochromic device for 150 seconds so as to be negative at the electrochromic electrode with respect to the counterelectrode. The electrochromic device was uniformly colored in blue, and the change in optical density at the center of the device was 0.50.

Immediately after the 150-second coloration of the device, an electrical voltage of 1.0 V was in turn applied across the device for 60 seconds so as to be positive at the electrochromic electrode against the counterelectrode. The device was then bleached back to the colorless initial state.

The electrochromic device was left in an oven at 65° C. and a humidity of 95% for 1,000 hours. The device is taken out from the oven and the peel off was not observed at the sealing portion.

Comparative Example 1

A cell of the same in size as that produced in Example 1 was produced. Instead of making an opening in the surface of the substrate, this cell has an opening of 10 mm width made by omitting a part of sealing applied to the peripheral edge of the two opposing substrates.

An electrolyte solution (1 mol/L concentration) containing an electrolyte of $LiClO_4$ in γ-butyrolactone solvent was charged in vacuum into the above-obtained cell. After washing the charging port with an ethanol, it was coated with a photo-setting adhesive manufactured by THREE BOND under the trade name of 3025 and then applied to a light of 4,000 mJ in illumination from a high voltage mercury vapor lamp thereby sealing the port.

The electrochromic device was left in an oven at 65° C. and a humidity of 95% for 400 hours. The device is taken out from the oven and the peel off was observed at the sealing portion of the port.

Comparative Example 2

An electrochromic device produced by following the procedures of Comparative Example 1 was placed on 5 cm³ of acrylic supporting members situated under the corners of the device so as to be deformed by its weight for one week. The peel off was observed at the portion of the sealing for the port.

What is claimed is:

1. A method for producing an electrochromic device which comprises the steps of (a) assembling a hollow cell constituting an electrochromic device by sealing together the entire peripheral edges of two electrically conductive substrates, at least one of which is transparent, disposed in a spaced-apart opposing relationship with each other and each having an opening identical in shape and position to that of the opposed substrate; (b) inserting into one of the openings an elastically deformable sealing member which is sufficient in size and length to dose both of the openings; (c) filling the inside of the hollow cell by vacuum-injecting an electrolyte or the precursor thereof through the other opening which remains open; (d) pushing the sealing member up to the opening for injecting the electrolyte or the precursor so as to dose this opening as well; and (e) bonding the sealing member extending through the two openings to each of the substrates with an adhesive.

2. A method for producing an electrochromic device according to claim 1 wherein said sealing member has a resiliently deformable ring-shaped protrusion on the longitudinal center thereof, wherein the outer diameter of the sealing member measured at the protrusion is 0.1–2 mm wider than the diameter of said opening of said electrically conductive substrate and the protrusion has a thickness of 0.05–1.5 mm measured with respect to the longitudinal direction of said sealing member.

3. A method for producing an electrochromic device according to claim 1 wherein said sealing member has a resiliently deformable O-shaped ring on the longitudinal center thereof, wherein the outer diameter of the sealing member measured at the ring is 0.1–2 mm wider than the diameter of said opening of said electrically conductive substrate and the ring has a thickness of 0.05–1.5 mm measured with respect to the longitudinal direction of said sealing member.

4. A method for producing an electrochromic device according to claim 1 wherein said sealing member is formed of a material selected from the group consisting of carbon fiber, polypropylene, stainless steel, a natural rubber, isoprene rubber, butadiene rubber, styrene-butadiene rubber, butyl rubber, ethylene-propylene rubber, chloroprene rubber, chlorosulfonated polyethylene, nitrile rubber, urethane rubber, polysulfide rubber, acrylic rubber, epichlorohydrin rubber, silicone rubber, fluorine rubber and hydrogenated nitrile rubber.

* * * * *